(12) United States Patent
Fox

(10) Patent No.: US 6,206,225 B1
(45) Date of Patent: Mar. 27, 2001

(54) PORTABLE DEVICE FOR DISPLAYING AND DISPENSING CARD-LIKE MEMBERS

(76) Inventor: Melody Fox, 80 S. Linden Dr., Ventura, CA (US) 93004

( * ) Notice: Subject to any disclaimer, the term of this patent is extended or adjusted under 35 U.S.C. 154(b) by 0 days.

(21) Appl. No.: 09/405,983

(22) Filed: Sep. 27, 1999

(51) Int. Cl.[7] .................................................. B60R 11/00
(52) U.S. Cl. ........................ 220/501; 206/330; 206/733; 206/734; 40/124
(58) Field of Search ..................... 206/734, 330, 206/733; 40/124; 220/501

(56) References Cited

U.S. PATENT DOCUMENTS

| | | | |
|---|---|---|---|
| 403,535 | * | 5/1889 | Johnson ................................ 206/730 |
| 867,109 | * | 9/1907 | Cathrea ................................ 206/730 |
| 1,185,831 | * | 6/1916 | Rizzotto ................................ 200/730 |
| 1,274,843 | * | 8/1918 | Bekkering ................................ 20/730 |
| 2,701,089 | * | 2/1955 | Eischer ................................ 206/734 |
| 3,146,739 | * | 9/1964 | Furman ................................ 312/245 |
| 5,645,203 | * | 7/1997 | Tappenden ............................ 40/124 |
| 5,752,622 | * | 5/1998 | Abell ................................ 221/97 |

* cited by examiner

Primary Examiner—Joseph M. Moy

(57) ABSTRACT

A portable device for displaying dispensing card-like members includes a generally rectangular box having a display storage cavity formed adjacent its forward wall for supporting card-like member in a vertical position for visible display. A main storage cavity is provided for storing a reserve supply of additional card-like members in a vertical position from which they may be easily dispensed. A support plate is removably attachable to the rear surface of the box, and the support plate in turn may be securely attached to a vertical support surface.

11 Claims, 3 Drawing Sheets

PORTABLE DEVICE FOR DISPLAYING AND DISPENSING CARD-LIKE MEMBERS

RELATED APPLICATION

This application discloses and claims an improvement over the invention disclosed and claimed in my application Ser. No. 09/021,188 filed Feb. 10, 1998, now U.S. Pat. No. 6,010,031 issued Jan. 4, 2000.

FIELD OF THE INVENTION

This invention relates to display devices, and more particularly to the visual display and convenient dispensing of card-like members such as business cards.

PRIOR ART

U.S. Pat. No. 5,645,203 issued Jul. 8, 1997 and entitled "Business Card Dispensing Holder".

BACKGROUND OF THE INVENTION

Sales persons engaged in extensive local travel by auto often have a need for business cards that are conveniently accessible to their customers or prospective customers. A holder and dispensing device for that specific purpose is shown in the patent referenced above. There are also many other situations in which a portable device for displaying and dispensing cards, brochures, or other card-like is either necessary or at least quite useful.

SUMMARY OF THE INVENTION

According to the present invention there is provided a portable device for supporting one card-like member in a vertical position for visible display, and for simultaneously storing a reserve supply of additional card-like members in a vertical position from which they may be easily dispensed.

Further according to the present invention the portable device may be securely supported from a vertical support surface such as the external surface of an automobile window, but may at the same time be readily removed from its support for greater convenience in dispensing the card-like members.

It is therefore the object of the invention to provide a device of the foregoing type which is easy to use, rugged and durable in construction, and inexpensive to manufacture.

DRAWING SUMMARY

CONCEPT OF THE INVENTION

Figure 1:
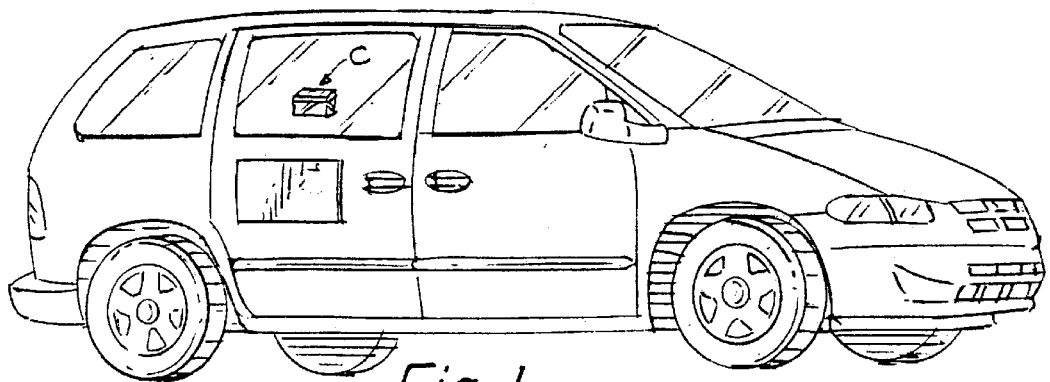
FIG. 1 is an elevation view of an automobile showing the device of the present invention attached to the outer surface of one of its windows.
Figure 2:
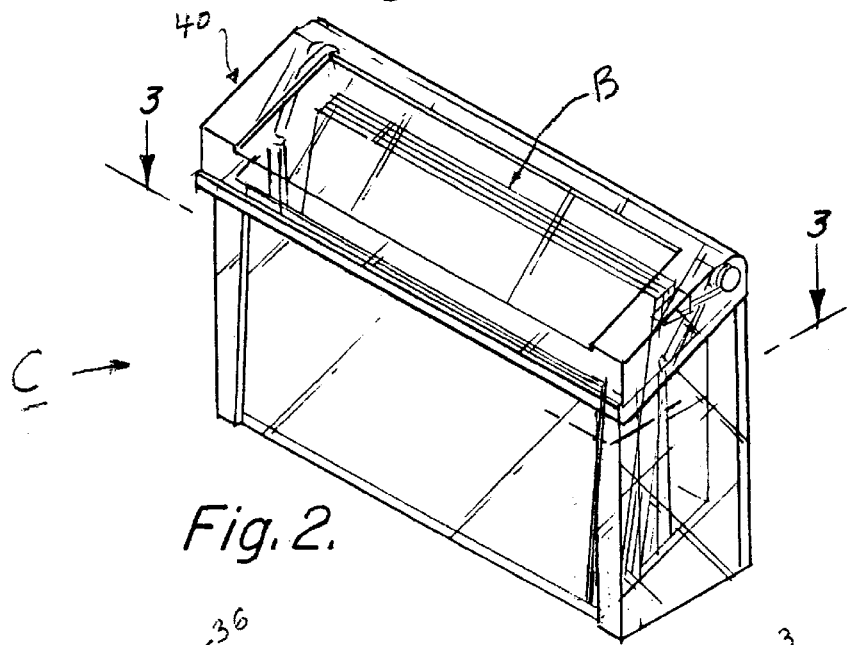
FIG. 2 is a perspective view of the device taken from and above its front, showing the lid in normally closed position.
Figure 3:
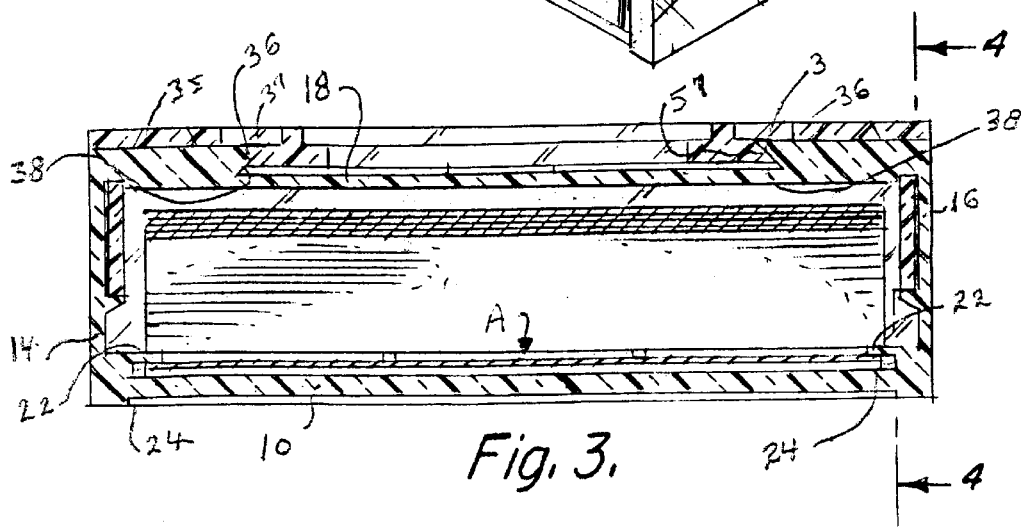
FIG. 3 is a horizontal cross-section view taken on the line 3—3 of FIG. 2.
Figure 4:
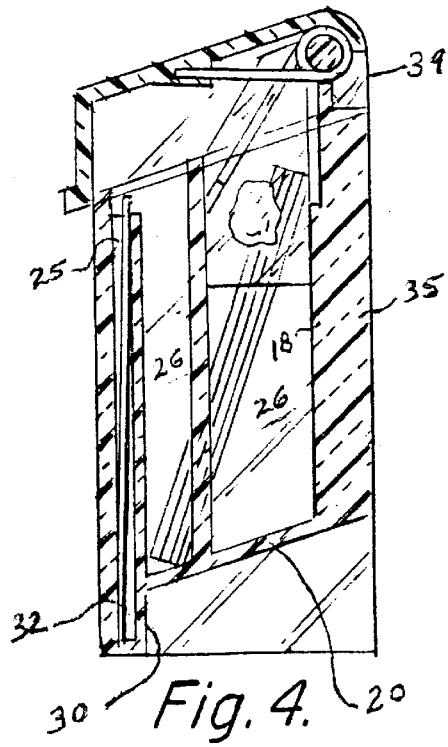
FIG. 4 is a cross-sectional elevation view taken on the line 4—4 of FIG. 3.
Figure 6:
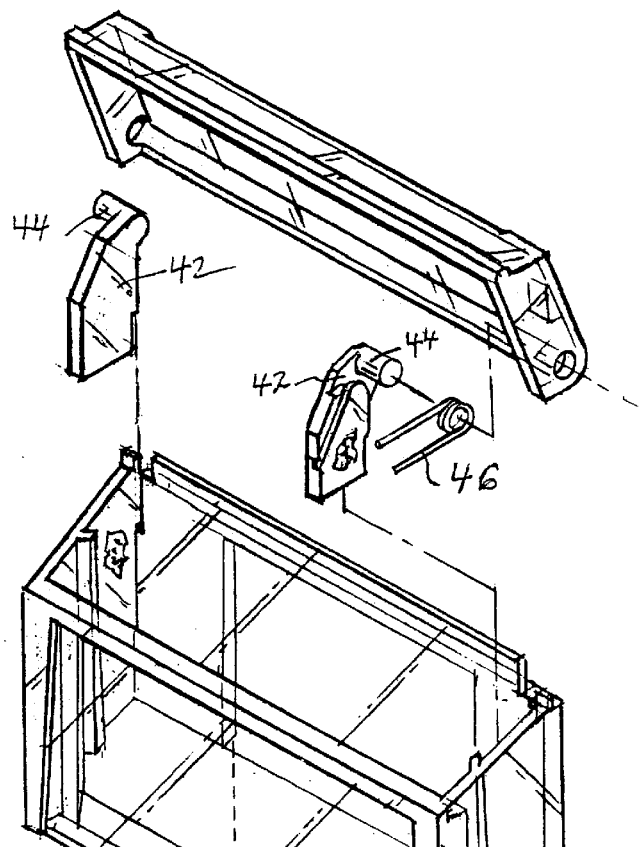
FIG. 6 is a perspective view like FIG. 2 but showing the lid in its open position.
Figure 6:
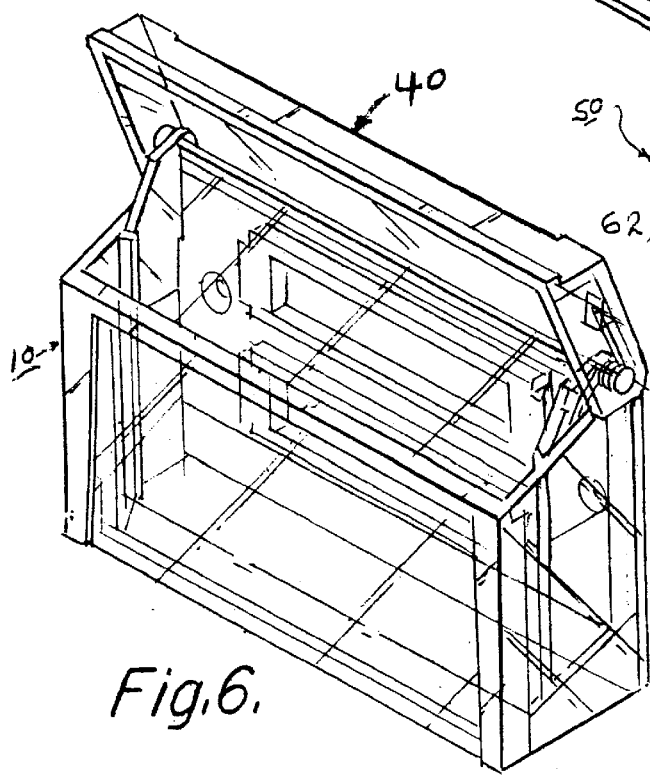
Figure 5:
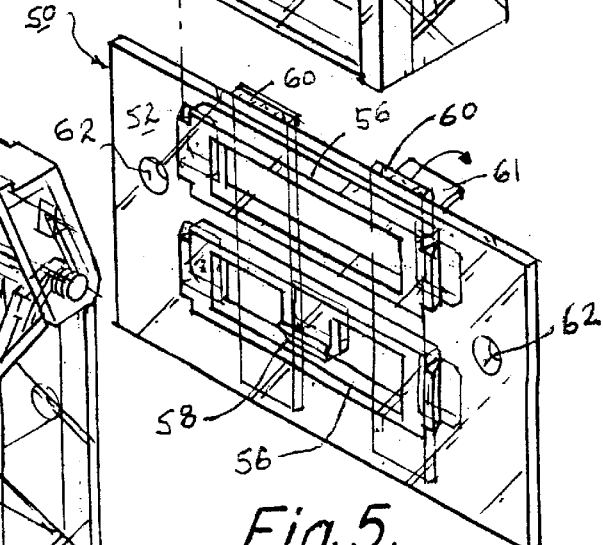
FIG. 5 is an exploded perspective view showing, from bottom to top, the support plate for the box, the box itself, the lid, the hinges, and the hinge spring.
Figure 7:
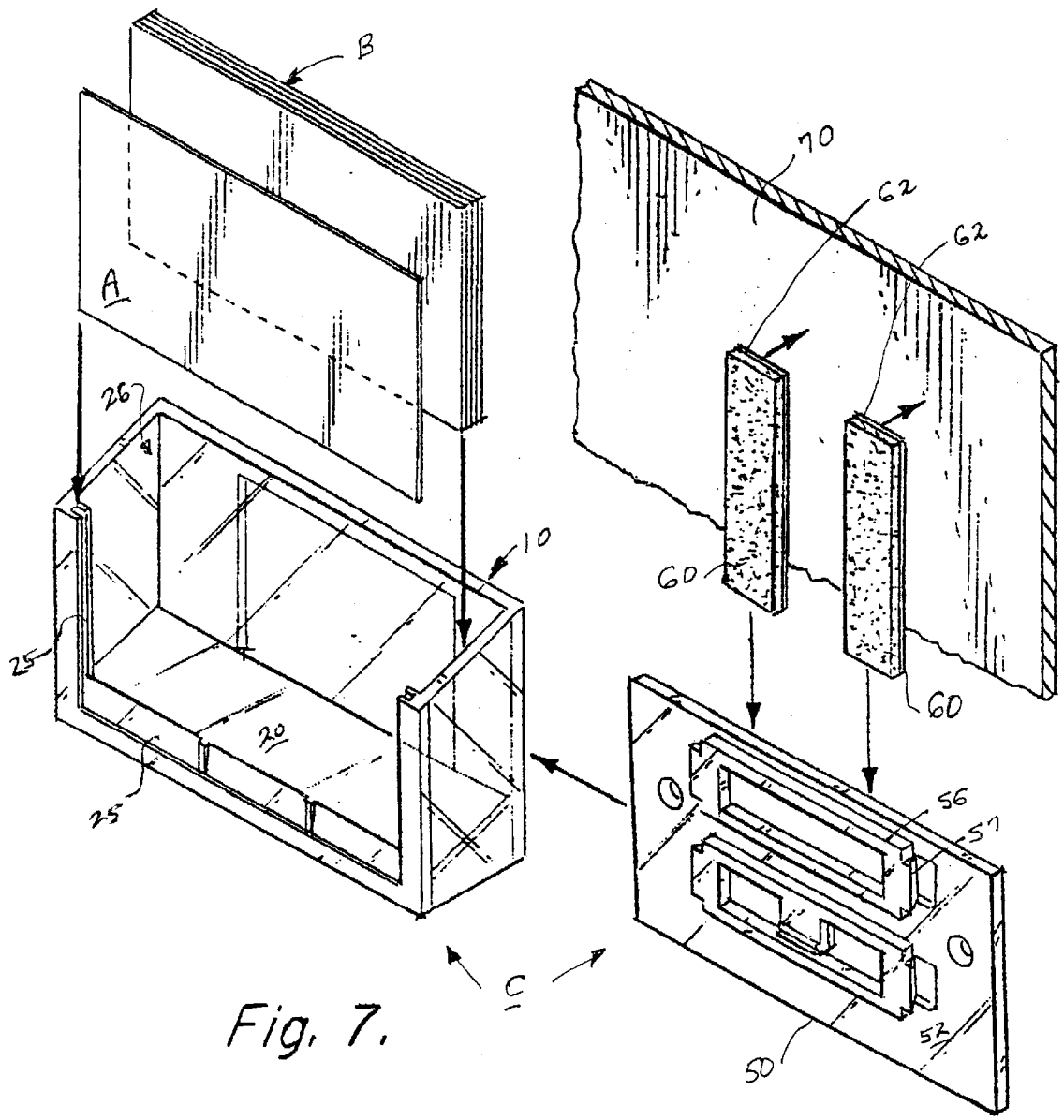
FIG. 7 is an exploded perspective view of the device with some details of construction omitted and others modified.

The concept of the invention is best shown in the exploded perspective view of FIG. 7. A particular card-like member to be visibly displayed is designated by letter A, while a reserve supply of card-like members is designated by letter B. The portable device of the present invention is designated by C. In FIG. 7 the lid 40, hinges 42, hinge pins 44, and hinge support spring 46 are omitted. Further, the configuration of the display cavity 25 is modified by omitting a large portion of front wall 12 of the box 10.

Thus as shown in FIG. 7 the box 10 forms a display cavity 25 parallel to its front wall and a main cavity 26 occupying the greatest part of its interior. In use, card-like member A to be on display will be dropped into the display cavity 25, while the reserve supply B will be dropped into the main cavity 26. It will be noted that the display cavity 25 extends somewhat below the main part of the bottom wall 20 of box 10, thus providing a secure support for card-like member A.

Also shown in FIG. 7 is the support plate 50, which has on its front surface 52 a pair of horizontally extending cross-pieces 56. Each cross-piece 56 has tongues 57 on its two ends. Although not clearly shown in FIG. 7, the rear wall 18 of the box has a recess that allows the box to be slid down over the cross-pieces 56 with a tongue-and-groove interengagement. This ensures solid support of the box 10 upon support plate 50.

A vertical support surface 70 is intended to receive and support the support plate 50. Glue strips 60 are provided to glue the rear surface of support plate 50 to the vertical surface 70.

In use, the box 10 with card-like members A and B may be detached from the support plate 50 and temporarily moved to some other location, as desired.

DESCRIPTION OF PREFERRED EMBODIMENT (Drawing FIGS. 2–6)

The box 10 has a front wall 12 and side walls 14, 16. Its rear wall is designated 18 and its bottom wall as 20. There are ridges 22 on the side walls leaving side wall grooves or slots which in part form the display cavity 25 parallel to front wall 12, for supporting the card-like member A to be displayed. The bottom wall 20 forming the bottom of main storage cavity 26 which holds the vertically oriented reserve supply B of card-like members, also has a downwardly offset portion 30 which forms the bottommost part 32 of the display cavity 25. The bottom wall 20 of the box slopes upward from the front wall towards the rear wall, so that the reserve card-like members B in the main storage cavity 26 will have their upper edges rising in a stair-stepped arrangement.

The rear wall 18 of box 10 also has an auxiliary rear wall 35 attached to its rear surface. A rectangular cut-out in the lower portion of rear wall 18, perhaps best seen in FIG. 7, provides a pair of vertical rear wall flanges 36, having tongues 37 and grooves 38 beneath the tongues. The top of the cut-out provides a horizontal stop bar 39.

Support plate 50 is adapted to removably support the rear wall 18, 35 of the box 10, the support plate 50 and the rear wall of the box having interengaging fastening means formed therein. More specifically, support plate 50 has a front surface 52 and rear surface 54. Extending horizontally across the front surface 52 are a pair of vertically separated cross-pieces 56, each providing tongues 57 on both of its ends. When box 10 is slid down upon support plate 50 the tongues 57 on the front surface of the support plate 50 engage and slide into the grooves 38 on the rear wall 18, 35, and the movement is stopped by the horizontal stop bar 39.

Support plate 50 on its front surface 52 has a protruding part 58, which protrudes somewhat further than the horizontal cross-pieces 56. When box 10 is slid onto the support plate, there is frictional contact between the protruding 58 and the rear surface of rear wall 18 of the box, thus ensuring a firm support. However, the box 10 may still be pulled away from the support plate 50 with a reasonable amount of upward force.

To removably secure the support plate 50 to a vertical support surface 70 I prefer to use glue strips 60, perhaps best seen in FIG. 7. The glue strips are normally covered by glue flaps 62 which can be peeled off to attach the support plate to a vertical surface, such as an automobile window.

As an alternative means of attachment if another type of vertical support surface is to be used, I also provide screw 64 in the two ends of the support plate 50.

The complete portable display and dispensing device C includes not only the box 10 and support plate 10 but also the lid 40 which normally closes the box. Hinges 42 are positioned adjacent the upper surfaces of side walls 14, 16 near the rear wall 18. Each hinge 42 has an associated hinge pin 44, which is preferably formed integrally with it, and which is inserted into a small opening in the associated side wall. One of the hinges has a spring 46 to normally keep lid 40 in its closed position.

Thus we have shown a portable device for displaying a card-like member in a vertical position for visible display, and for concurrently storing a reserve supply of additional card-like members in a vertical position from which they may be easily dispensed, The device includes an open-topped generally rectangular box having side walls, a front wall, and a rear wall. A display cavity 25 for supporting the one card-like member A to be displayed is disposed parallel to the front wall of the box and is formed in part by a pair of slots in the side walls of the box adjacent to its front wall.

The box also has a bottom wall 20 forming the bottom of a main storage cavity 26 to hold the vertically oriented reserve supply B of card-like members. The bottom wall also has a downwardly offset portion 30 forming the bottom portion 32 of the display cavity 25.

Support plate 50 is adapted to removably support the rear wall of the box 10, the support plate and the rear wall of the box having interengaging fastening means. Although a tongue-and-groove type of fastening has been shown, it will be evident to those skilled in the art that other fastening means may be used if desired.

While I have shown particular means for removably securing the support plate 50 to a vertical support surface, it will be evident to those skilled in the art that other and different support means may be used, all within the scope and spirit of the present invention.

Although the presently preferred form of my invention has been disclosed in detail in order to comply with the disclosure requirements of the patent laws, it will nevertheless be under stood that the invention is not thus limited, and that its scope is to be determined in accordance with the appended claims.

What I claim is:

1. A portable device for displaying one card-like member in a vertical position for visible display and for storing a reserve supply of additional card-like members in a vertical position from which they may be easily dispensed, the device comprising:

an open-topped generally rectangular box having side walls, a front wall, and a rear wall, and having a display cavity parallel to its front wall formed in part by a pair of slots in its side walls adjacent to its front wall for supporting the one card-like member to be displayed;

the box having a bottom wall forming the bottom of a main storage cavity to hold the vertically oriented reserve supply of card-like members, the bottom wall also having a downwardly offset portion forming the bottom of the display cavity;

a support plate adapted to removably support the rear wall of the box, the support plate and the rear wall of the box having interengaging fastening means formed therein; and means for removably securing the support plate to a vertical support surface.

2. The device of claim 1 wherein the support plate and the rear wall of the box have interengaging tongue-and-groove means formed thereon.

3. A display device as in claim 1 wherein the bottom wall of the box slopes upward from the front wall towards the rear wall, so that the reserve card-like members in the main storage cavity will have their upper edges rising in a stair-stepped arrangement.

4. A display device as in claim 1 wherein the support plate and the rear wall of the box have a friction contact portion for holding the box securely on the support plate.

5. A display device as in claim 1 wherein the support plate has a rear surface with a coating of glue thereon, whereby the support plate may be secured to a vertical support surface.

6. A display device as in claim 1 wherein the front wall consists only of a bottom section and side sections so that the display cavity is clearly visible from the front.

7. A display device as in claim 1 wherein the front wall of the box is contiguous, the slots in the side walls of the box are behind the front wall, and the front wall is also transparent to permit viewing the card-like member in the display cavity.

8. A portable device for displaying card-like members, comprising:

an open-topped generally rectangular box having side walls, a front wall, a rear wall, and a bottom wall, the box having a pair of ridges on its side walls adjacent and parallel to its front wall providing grooves behind the front wall, and the front wall being transparent, whereby one of the card-like members may be vertically disposed in a visually displayed position behind the front wall but in front of the side wall ridges, the space behind the ridges then providing a main storage cavity adapted to hold a vertically oriented reserve supply of the card-like members;

a support plate adapted to support the rear wall of the box, the support plate and the rear surface of the rear wall of the box having interengaging fastening means for removably securing the box to the support plate; and means on the support plate for securing it to a vertical support surface.

9. A display device as in claim 8 wherein the support plate and the rear wall have interengaging tongue-and-groove support means, as well as a friction contact portion for holding the box securely on the support plate.

10. A display device as in claim 8 wherein the support plate has a rear surface with a coating of glue thereon, whereby the support plate may be secured to a vertical support surface.

11. A portable device for displaying card-like members, comprising:

an open-topped generally rectangular box having side walls, a front wall, a rear wall, and a bottom wall, the box having a pair of ridges on its side walls adjacent and parallel to its front wall providing grooves behind the front wall, and the front wall being transparent, and the bottom wall sloping upward from the front wall toward the rear wall, whereby one of the card-like members may be vertically disposed in a visually displayed position behind the front wall but in front of the side wall ridges, the space behind the ridges then providing a main storage cavity adapted to hold a vertically oriented reserve supply of the card-like members, so that the upper edges of the reserve card-like members in the main storage cavity rise in a stair-stepped configuration;

a support plate adapted to support the rear wall of the box, the support plate and the rear surface of the rear wall of the box having interengaging fastening means for removably securing the box to the support plate; and means on the support plate for securing it to a vertical support surface.

* * * * *